(12) United States Patent
Cis et al.

(10) Patent No.: US 10,508,746 B2
(45) Date of Patent: Dec. 17, 2019

(54) SPOOL VALVE

(71) Applicant: Hamilton Sundstrand Corporation, Charlotte, NC (US)

(72) Inventors: Marcin Cis, Lutynia (PL); Dominik Gunia, Szczytna (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 15/964,168

(22) Filed: Apr. 27, 2018

(65) Prior Publication Data

US 2019/0024806 A1 Jan. 24, 2019

(30) Foreign Application Priority Data

Jul. 18, 2017 (EP) .................................... 17461570

(51) Int. Cl.
*F16K 11/07* (2006.01)

(52) U.S. Cl.
CPC .......... *F16K 11/07* (2013.01); *F16K 11/0708* (2013.01); *Y10T 137/0502* (2015.04); *Y10T 137/8671* (2015.04)

(58) Field of Classification Search
CPC ................. F16K 11/07; F16K 11/0708; Y10T 137/8671; Y10T 137/0502
See application file for complete search history.

(56) References Cited

U.S. PATENT DOCUMENTS

| 3,717,175 A | * | 2/1973 | Boydell | F15B 13/04 |
| | | | | 137/596.13 |
| 3,735,780 A | * | 5/1973 | Heid | F16K 11/07 |
| | | | | 137/625.69 |
| 3,995,532 A | * | 12/1976 | Junck | F15B 13/04 |
| | | | | 91/529 |
| 4,155,535 A | * | 5/1979 | Seamone | F16K 11/0708 |
| | | | | 137/625.3 |
| 4,245,816 A | | 1/1981 | Johnson | |
| 4,862,920 A | * | 9/1989 | Cleasby | F15B 13/04 |
| | | | | 137/625.3 |
| 4,981,159 A | * | 1/1991 | Christensen | F15B 13/0417 |
| | | | | 137/596.13 |

(Continued)

FOREIGN PATENT DOCUMENTS

DE    3126269 A1    4/1982
GB     558363 A    1/1944

OTHER PUBLICATIONS

Extended European Search Report for International Application No. 17461570.8 dated Feb. 21, 2018, 7 pages.

*Primary Examiner* — Craig J Price (74) *Attorney, Agent, or Firm* — Cantor Colburn LLP (57) ABSTRACT

A spool for a spool valve having a longitudinal axis (L). The spool comprising: a plurality of lands each having a substantially radially extending metering edge and an axially extending circumferential surface; a plurality of grooves separating each of the plurality of the lands; and a guiding section located axially between at least one land and an adjacent groove. The guiding section comprising a plurality of circumferentially spaced guiding surfaces being substantially flush and contiguous with the circumferential surface of the land, wherein the guiding section allows fluid communication between the groove and the metering edge of the land.

10 Claims, 7 Drawing Sheets

(56) References Cited

U.S. PATENT DOCUMENTS

| | | | | |
|---|---|---|---|---|
| 5,682,744 A | * | 11/1997 | Hasegawa | B62D 5/087 137/625.3 |
| 6,397,890 B1 | * | 6/2002 | Mickelson | F15B 13/0402 137/625.34 |
| 6,450,194 B1 | * | 9/2002 | Wasson | F15B 13/0402 137/351 |
| 6,739,293 B2 | * | 5/2004 | Turner | F01L 9/02 123/90.11 |
| 6,851,451 B2 | * | 2/2005 | Hoefling | B23H 9/00 137/625.3 |
| 2005/0005971 A1 | * | 1/2005 | Stafford | F16H 61/14 137/454.2 |
| 2007/0131290 A1 | * | 6/2007 | Kim | F16K 11/07 137/625.69 |
| 2010/0206413 A1 | * | 8/2010 | Rub | F15B 11/003 137/625.48 |

\* cited by examiner

SPOOL VALVE

FOREIGN PRIORITY

This application claims priority to European Patent Application No. 17461570.8 filed Jul. 18, 2017, the entire content of which is incorporated herein by reference.

TECHNICAL FIELD

This disclosure relates to a spool for a spool valve, and a spool valve featuring the same. This disclosure also relates to a method of preventing deformation of a spool valve housing adjacent a control port. Such spool valves are often used in hydraulic systems for aerospace applications, for instance, in two stage servovalves.

BACKGROUND

Figure 1A:
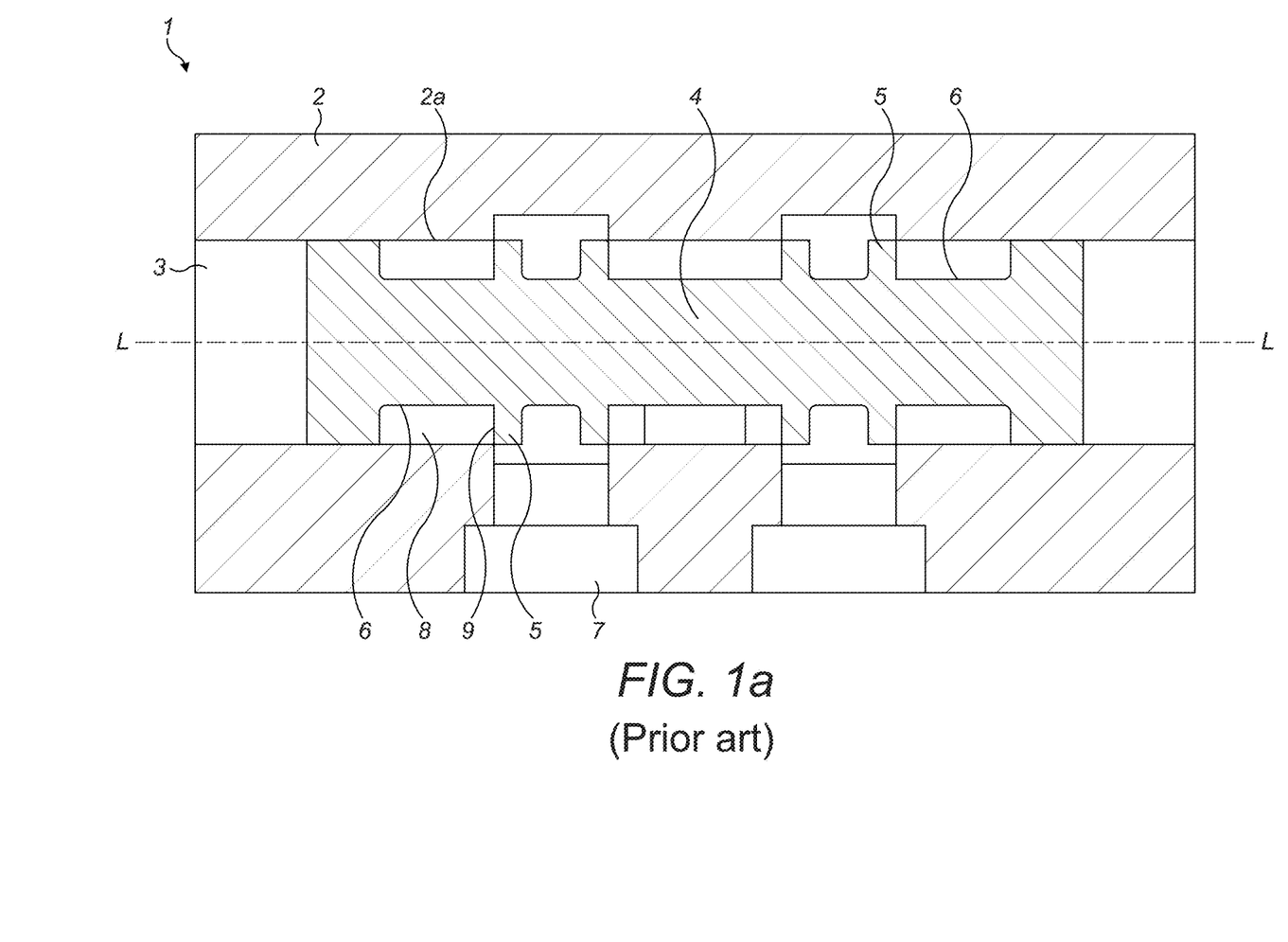
FIG. 1a schematically shows a prior art spool valve with metering edges closing the control port.
Figure 1B:
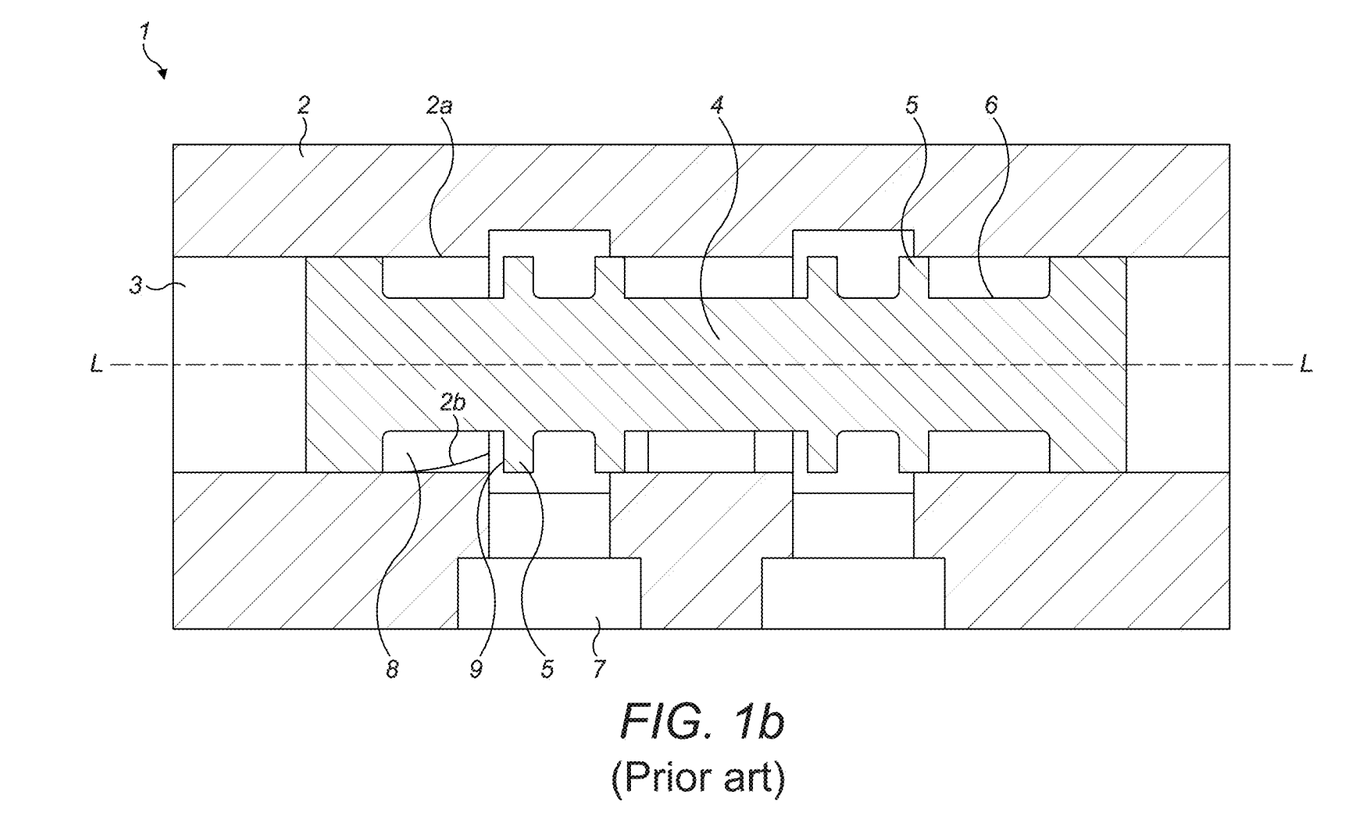
FIG. 1b schematically shows the prior art spool valve of FIG. 1a with the control port in fluid communication with the chamber.

Spool valves are well-known in the art for controlling hydraulic systems. As shown in FIGS. 1a and 1b, a typical spool valve 1 comprises a spool housing 2 having a spool cavity 3 defined by an inner surface 2a of the housing 2, and a spool 4 disposed within the spool cavity 3 having a plurality of lands 5 separated by a plurality of grooves 6. The spool 4 is moveable along its longitudinal axis L in response to actuation of the spool valve 1, and the lands 5 are in sliding contact with the inner surface 2a of the housing 2. The spool valve 1 further comprises a control port 7 passing through the inner surface 2a of the housing 2 in fluid communication with the spool cavity 3. A chamber 8 is defined between the groove 6, the land 5 and the inner surface 2a of the housing 2. The lands 5 have radially extending metering edges 9 (as are well-known in the art of spool valves) which permit or prevent fluid communication between the control port 7 and the chamber 8 depending on the longitudinal position of the spool 4 within the spool cavity 3. As shown in FIG. 1a, the metering edges 9 are radially aligned with the edges of the control port 7, so no fluid communication is permitted between the control port 7 and the chamber 8. As shown in FIG. 1b, actuation of the spool valve 1 causing the spool 4 to move longitudinally (to the right as you look at the Figure) causing the metering edges 9 to become radially misaligned with the edges of the control port 7, which permits fluid communication between the control port 7 and the chamber 8. In this manner, actuation of the spool valve 1 can be used to control fluid movement in a hydraulic system, such as a servovalve.

As shown in FIG. 1b, in typical spool valves 1, high fluid pressure in the housing 2 and control ports 7 can cause deformation of the housing 2 adjacent the control port 7. Deformed portions 2b of the housing 2 can lock the spool 4 in a longitudinal position and/or prevent it from moving back to another longitudinal position. Since the radial clearance between the spool 4 and housing 2 is typically in the micrometer range, any small deformation could lock the spool 4. Spool locking prevents proper function of the spool valve and associated hydraulic system, and may result in having to replace the spool valve.

The present disclosure aims to provide a spool that prevents the aforementioned spool housing deformation.

SUMMARY

From a first aspect, the present disclosure relates to a spool in accordance with claim 1.

As will be appreciated by the skilled person, land, groove and metering edge are well-known terms in the art of spool valves. Specifically: the land is an increased diameter portion of the spool (compared to the groove) that blocks fluid flow through a spool valve and guides the spool as it moves in a housing of the spool valve; the groove is a reduced diameter portion of the spool (compared to the land) that allows fluid to flow around the spool and through the spool valve; and the metering edge is the edge surface of the land that dictates whether fluid flow is blocked or allowed around/through the spool valve.

"Substantially radially" means that within the scope of this disclosure, in some embodiments, the metering edge extends in a purely radial direction (i.e. perpendicular to the longitudinal axis), but in other embodiments, may be slightly offset from the radial direction. This could mean, for instance, that the metering edge is aligned at an angle relative to the radial axis (e.g. leaning radially inwardly towards the groove) or has a camber (e.g. within manufacturing tolerances).

"Substantially flush" means that within the scope of the disclosure, in some embodiments, the guiding surfaces are precisely flush with the circumferential surface (within manufacturing tolerances), but in other embodiments may be slightly offset below the circumferential surface.

By the guiding section allowing fluid communication between the groove and the metering edge of the land, it is meant that at least a portion of the metering surface is exposed to the groove, such that fluid communication between the groove and the metering edge is not impeded by the guiding section. In other words, the guiding section does not fully cover the metering edge.

The guiding section provides support against the spool housing when in use in a spool valve, which can prevent housing deformation (such as described above in the Background section).

In one embodiment of the above spool, the guiding section further comprises a web extending radially inward of the circumferential surface of the land (i.e. towards the longitudinal axis) that connects the plurality of guiding surfaces.

In a further embodiment of the above spool, the web includes a surface, connecting adjacent guiding surfaces that is recessed radially inward from the circumferential surface. In this manner, the web may provide a connecting surface between the adjacent guiding surfaces that forms a "pocket", or in other words, a portion of the metering edge that is exposed to the groove. The web may also include a radially extending surface, which may be planar, between the connecting surface and the groove. In some embodiments, the connecting surface is a concave surface that may be contiguous with the adjacent metering edge. In some embodiments, the concave surface may be curved. In alternative embodiments, the recessed connecting surface need not be concave, and could be flat or convex instead, as long as a portion of the metering edge is exposed to the groove.

In another embodiment of any of the above spools, the plurality of guiding surfaces are evenly spaced around the longitudinal axis of the spool.

In another embodiment of any of the above spools, the plurality of guiding surfaces comprises at least three guiding surfaces. In further embodiments, the plurality of guiding surfaces comprises between three to six guiding surfaces, or in other words, any of three guiding surfaces, four guiding surfaces, five guiding surfaces or six guiding surfaces.

From another aspect, the present disclosure relates to a spool valve in accordance with claim 6.

In an embodiment of the above spool valve, the spool valve further comprises a control port passing through the inner surface of the housing and in fluid communication with the spool cavity. The spool valve also further comprises a chamber defined between the groove, the land and the inner surface of the housing. The metering edge of the land is configured to permit or prevent fluid communication between the control port and the chamber depending on the longitudinal position of the spool within the spool cavity.

In another embodiment of any of the above spools or spool valves, the land comprises two opposing metering edges and two opposing guiding sections.

In another embodiment of any of the above spools or spool valves, there a plurality of pairs of lands, such as two pairs, wherein the lands in each pair are separated by a spacer groove and each land has a respective guiding section. In a further embodiment, the metering edges and guiding sections of the lands in each pair oppose each other.

In another embodiment of any of the above spools or spool valves, the spool comprises steel, such as a soft steel, and outer surfaces, such as the guiding surfaces, circumferential surfaces and/or the metering edges comprise a hardened steel.

From another aspect, the present disclosure relates to a method of preventing deformation of a spool valve housing adjacent a control port in accordance with claim 12.

BRIEF DESCRIPTION OF DRAWINGS

One or more non-limiting examples will now be described, by way of example only, and with reference to the accompanying figures in which:

FIG. 3b illustrates a perspective cross-sectional view of the spool valve of FIG. 3a.

DETAILED DESCRIPTION

Figure 2:
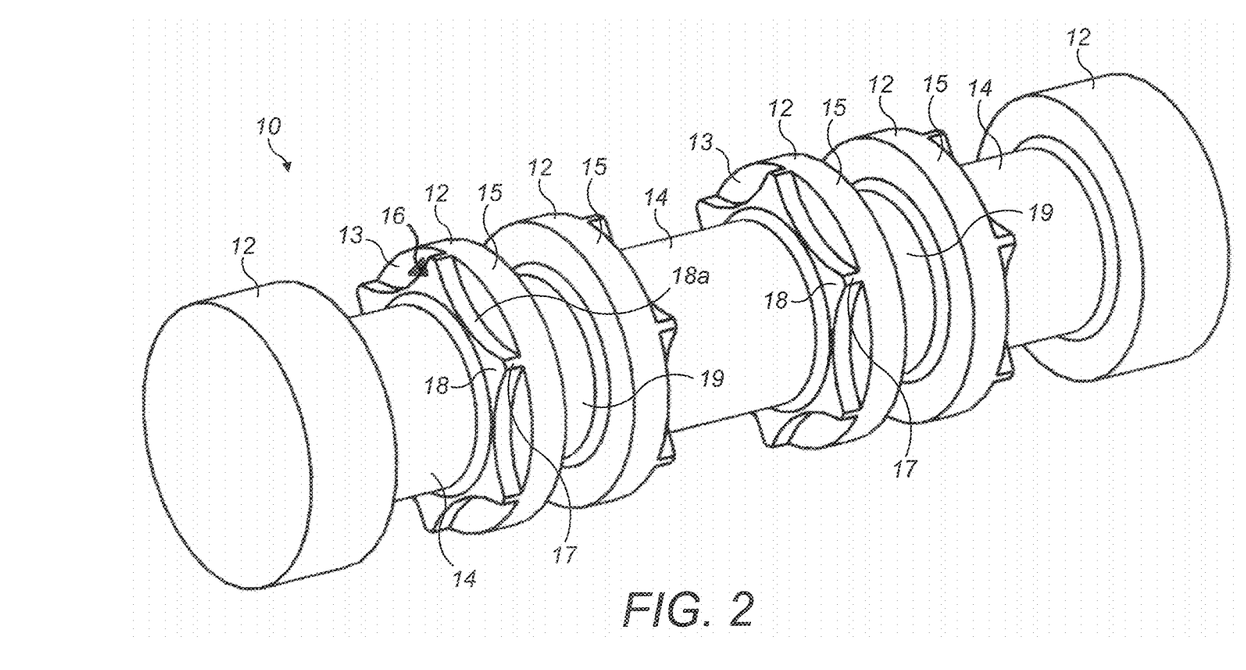
FIG. 2 illustrates a perspective view of an exemplary spool for a spool valve in accordance with this disclosure.
Figure 3A:
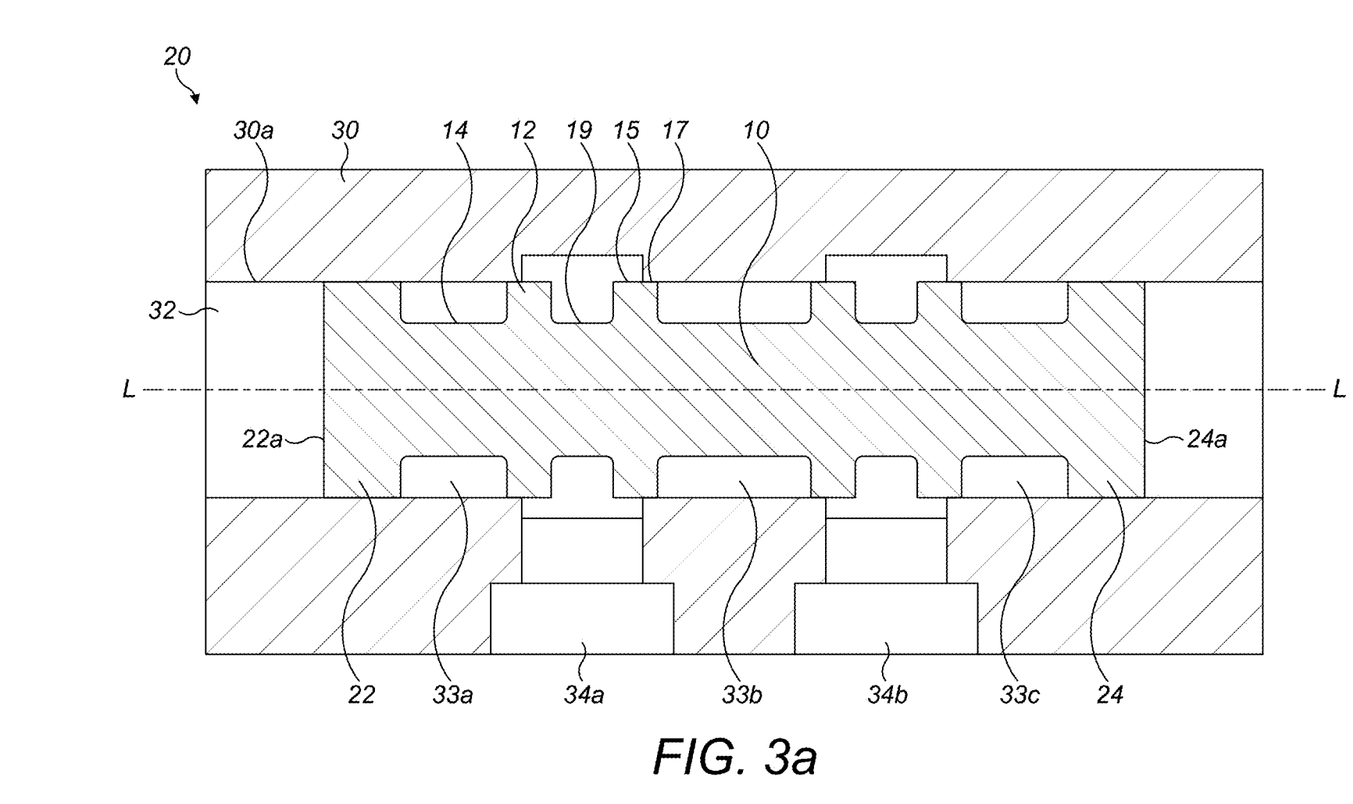
FIG. 3a illustrates a cross-sectional view of an exemplary spool valve featuring the spool of FIG. 2.
Figure 3B:
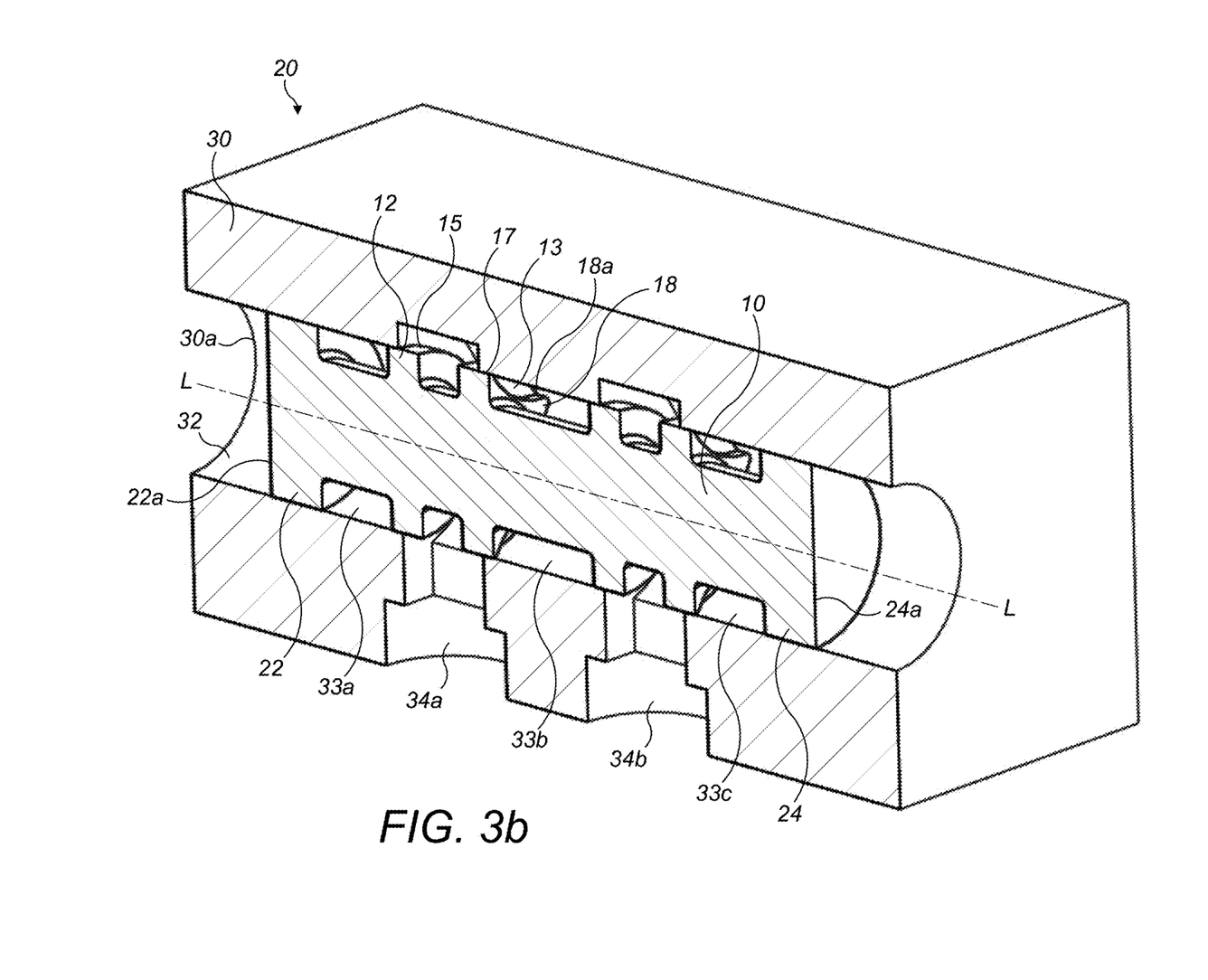

FIG. 2 schematically illustrates an exemplary spool for a spool valve in accordance with an embodiment of the present disclosure. Spool 10 has a longitudinal axis L and comprises a plurality of lands 12 and grooves 14 spaced axially along the spool 10 and a plurality of guiding sections 16 located between the lands 12 and grooves 14. Lands 12 each include a radially extending metering edge 13 and a circumferential surface 15 circumscribing the spool 10.

In the depicted embodiment, there are two pairs of opposing lands 12 with a reduced diameter portion or "spacer groove" 19 between each pair. However, in other embodiments, there can be two single lands 12 providing a pair of opposing guiding sections 16. In other words, in such embodiments, the "spacer groove" 19 is not present, and the circumferential surface 15 extends between two opposing guiding sections 16 forming a single land 12 with opposing guiding sections 16, rather than a separate pair of opposing lands 12 with a guiding section 16 each.

The plurality of guiding sections 16 comprise a plurality of circumferentially spaced guiding surfaces 17 and a web 18 radially inward of the circumferential surface 15 connecting them. The guiding surfaces 17 extend axially and contiguously from the circumferential surface 15 of the land 12 and are flush therewith. The web 18 provides a curved surface 18a that connects circumferentially adjacent guiding surfaces 17. As shown in FIG. 2, this surface 8a curves radially inward providing a concave surface 8a. In this manner, the web 18 allows a portion of the metering edges 13 to be exposed to the grooves 14. This is important, as it means the guiding section 16 does not prevent fluid communication between the grooves 14 and the metering edges 13, and so does not inhibit spool valve performance, as will become more clear from the description of spool valve operation in relation to FIGS. 3a-4b below.

It is to be noted, that the depicted web 18 or its particular shape is not an essential feature of the present disclosure, and the guiding section 16 could instead feature discrete circumferentially spaced guiding surfaces 17 that are not connected to each other or a connecting web of any other suitable shape, as long as fluid communication is permitted between the grooves 14 and the metering edges 13. Nevertheless, a web may support guiding surfaces 17 and may make guiding surfaces 17 easier to manufacture, by allowing more simple machining of a portion of the land 12 to form them. Any other suitable method for manufacturing the guiding section 16/guiding surfaces 17 is also within the scope of the disclosure, for instance, joining separate guiding sections 16/guiding surfaces 17 to lands 12, for instance by welding, or forming the guiding sections 16/guiding surfaces 17 onto the land 12, for instance by additive manufacturing.

The depicted guiding sections 16 have six evenly spaced guiding surfaces 17 around the circumference of the spool axis L (i.e. at 60° intervals), which can provide adequate and even support to the housing 30 in the spool valve 20, as will become more clear from the description of spool valve operation in relation to FIGS. 3a-4b below. However, it is to be noted that any number of guiding surfaces 17 can be used (as long as there are at least two), with any appropriate spacing around the land circumference (even or otherwise). For example, two, three, four or five evenly spaced guiding surfaces 17 may be used instead of the six depicted. Even more guiding surfaces 17 could be used if extra support is required, however, there is a trade-off with ease of machining and weight considerations.

FIGS. 3a-4b show a spool valve 20 that comprises the spool 10 disposed within a spool housing 30. The housing 30 has an inner surface 30a that defines a spool cavity 32. The spool 10 is disposed in the cavity 32 and is moveable along its longitudinal axis L therein. In this way, spool 10 can move in response to actuation of the spool valve 20. The circumferential surfaces 15 of the lands 12 and guiding surfaces 17 are in sliding contact with the housing inner surface 30a, and this contact keeps the spool 10 centred within the spool housing 30. By sliding contact, it is meant that the surfaces 15, 17 contact the inner surface 30a of the housing 30, but are permitted to slide against the inner surface 30a in response to actuation of the spool valve 20

(i.e. to permit movement of the spool 10). Chambers 33a, 33b and 33c are defined between respective grooves 14 and lands 12 and the inner surface 30a.

Figure 4A:
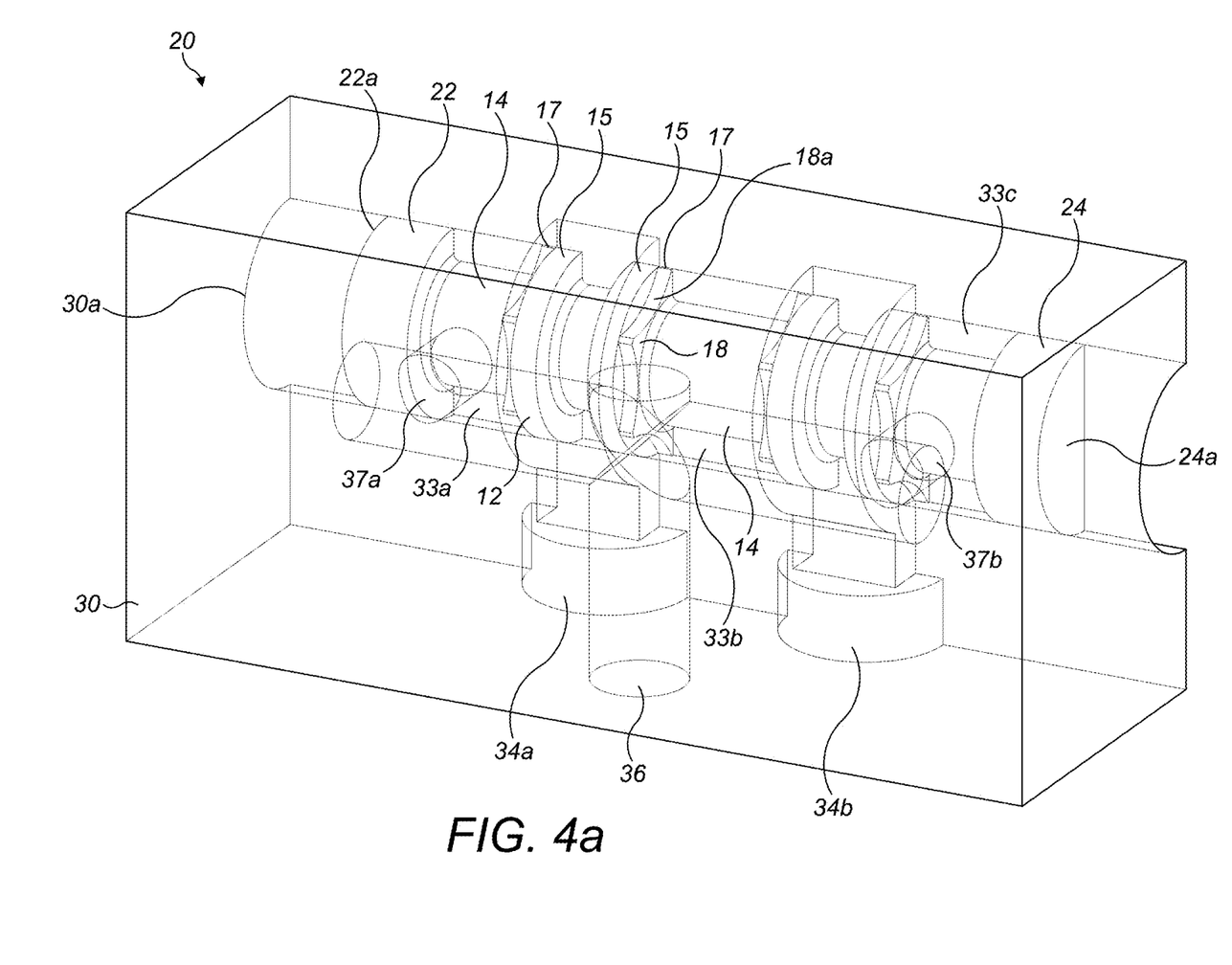
FIG. 4a illustrates a perspective view of the spool valve of FIG. 3a showing the spool disposed within the spool cavity through the housing.
Figure 4B:
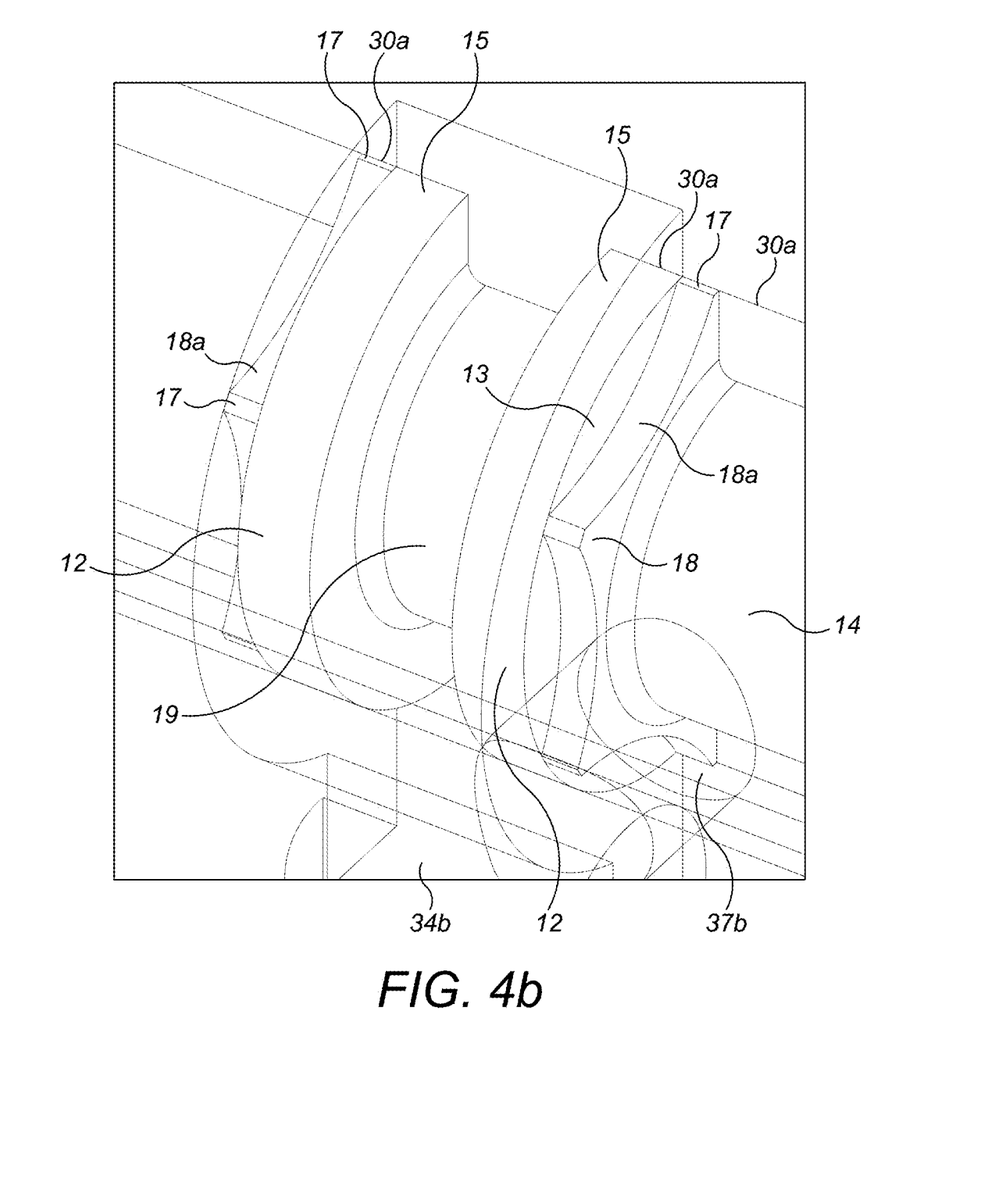
FIG. 4b shows a magnified view of FIG. 4a, focusing on the spool lands.

The housing 30 includes control ports 34a, 34b passing through the housing 30 and having an opening through the inner surface 30a of the housing 30 such that the control ports 34a, 34b are in fluid communication with the spool cavity 32. As shown in FIGS. 4a and 4b, a supply port 36 also passes through the housing 30 and has delivery channels 37a, 37b with openings through the inner surface 30a of the housing 30 to provide fluid communication with chambers 33a and 33c, respectively. A return port (not shown) is also provided through the housing 30 and is in fluid communication with chamber 33b in between the control ports 34.

The operation of the spool valve 20 will now be described.

As shown in FIGS. 3a-4b, the spool valve 20 is in a neutral or closed position. In this position, fluid pressure on either side of the spool 10 (against metering edge 22a and metering edge 24a) is equal. This results in the spool 10 being unbiased and metering edges 13 being radially aligned with the edges of the control ports 34a, 34b, preventing fluid communication between the control ports 34a, 34b and chambers 33a, 33b, 33c.

When in operation, fluid is supplied under pressure to control ports 34a, 34b. When spool valve 20 is actuated, differential fluid pressure is provided to the opposite sides of the spool 10. For instance, if actuation requires the spool 10 to move right when looking at FIGS. 3a-4b, a higher fluid pressure is generated against metering edge 22a of left-hand end land 22 than on metering edge 24a of right-hand end land 24 (e.g. by a torque motor and nozzle flapper assembly, as known in the art). This causes the spool 10 to slide right relative to the housing 30. This longitudinal movement of spool 10 causes metering edges 13 to become misaligned with the edges of control ports 34a, 34b. However, guiding surfaces 17 remain in contact with the inner surface 30a. This permits fluid communication between control port 34a, chamber 33a and delivery channel 37a and permits fluid communication between the right hand control port 34b, chamber 33b and return port (not shown), whilst maintaining contact between the guiding surface 17 and the inner surface 30a of the housing 30. This permits pressurised fluid to flow from the control port 34a to the supply port 36 and from the control port 34b to the return port (not shown), whilst supporting the housing 30 to prevent deformation of the housing 30.

Actuation of the spool valve 20 in the opposite direction is caused by providing a higher fluid pressure against metering edge 24a compared to metering edge 22a instead. This causes the spool 10 to move left, allowing fluid communication between control port 34b, chamber 33c and delivery channel 37b and between control port 34a, chamber 33b and return port (not shown). This permits pressurised fluid to flow from the control port 34a to the return port (not shown) and from the control port 34b to the supply port 36.

In this manner, spool valve 20 allows a relatively small, precise movement of spool 10 to result in a large movement of pressurised fluid for use in hydraulic systems.

As shown in FIG. 1b, in typical spool valves 1, the fluid pressure from control ports 7 cause can deformation of the housing 2 at portions 2b near the control ports 7. However, the contact of the guiding surfaces 17 to the inner surface 30a of the housing 30 during operation of the spool valve 20 prevents this deformation, without affecting spool valve actuation.

In one embodiment, spool 10 comprises steel, such as a soft steel, and outer surfaces such as the guiding surfaces 17, circumferential surfaces 15 and metering edges 13 comprise a hardened steel, for instance, a case hardened steel. This provides a hard surface for contact with the inner surface 30a of the housing 30, and allows the metering edges 13 to cope with the high forces experienced due to high fluid pressures. In other embodiments, spool 10 and/or outer surfaces may comprise a stainless steel to provide additional corrosion resistance against the fluid used in the spool valve 20.

The invention claimed is:

1. A spool valve comprising:
   a housing having a spool cavity therein defined by an inner surface of the housing; and
   a spool having a longitudinal axis (L), the spool and comprising:
   a plurality of lands each having a substantially radially extending metering edge and an axially extending circumferential surface;
   a plurality of grooves separating each of the plurality of the lands; and
   a guiding section located axially between at least one land and an adjacent one of the plurality of grooves, wherein the guiding section comprises a plurality of circumferentially spaced guiding surfaces being substantially flush and contiguous with the circumferential surface of the land and a web defined by a radially extending planar surface that is radially inward of the circumferential surface of the land and connects the plurality of guiding surfaces,
   wherein the web also defines a connecting surface that connects adjacent ones of the plurality of guiding surfaces and that is recessed radially inward from the circumferential surface to expose a portion of the metering edge between the plurality of guiding surfaces to the groove, such that the guiding section allows fluid communication between the groove and the metering edge of the land;
   wherein the spool is moveable along its longitudinal axis (L) in response to actuation of the spool valve, and the circumferential surface of the land and the guiding surfaces are in sliding contact with the inner surface of the housing; and
   the spool valve further comprising:
   a control port passing through the housing and in fluid communication with the spool cavity; and
   a chamber defined between the groove, the land and the inner surface of the housing, wherein the metering edge of the land is configured to permit or prevent fluid communication between the control port and the chamber depending on the longitudinal position of the spool within the spool cavity.

2. The spool valve of claim 1, wherein the connecting surface is a curved concave surface.

3. The spool valve of claim 1, wherein the plurality of guiding surfaces are evenly circumferentially spaced around the longitudinal axis (L).

4. The spool valve of claim 1, wherein the plurality of guiding surfaces comprises at least three guiding surfaces.

5. The spool valve of claim 1, wherein the land comprises two opposing metering edges and two opposing guiding sections.

6. The spool valve of claim 1, comprising a plurality of pairs of lands, such as two pairs, wherein the lands in each pair are separated by a spacer groove and each land has a respective guiding section.

7. The spool valve of claim 6, wherein the metering edges and guiding sections of the lands in each pair oppose each other.

8. The spool valve of claim 1, wherein the spool comprises steel and the guiding surfaces, circumferential surfaces and metering edges comprise a hardened steel.

9. The spool valve of claim 1, wherein the plurality of guiding surfaces comprises between three to six guiding surfaces.

10. A method of preventing deformation of a spool valve housing adjacent a control port, comprising:

providing a land of a spool with a guiding section comprising a plurality of circumferentially spaced guiding surfaces being substantially flush and contiguous with the circumferential surface of the land and a web defined by a radially extending planar surface that is radially inward of the circumferential surface of the land and connects the plurality of guiding surfaces, wherein the web also defines a connecting surface that connects adjacent ones of the plurality of guiding surfaces and that is recessed radially inward from the circumferential surface to expose a portion of the metering edge between the plurality of guiding surfaces to the groove, such that the guiding section allows fluid communication between the groove and the metering edge of the land;

disposing the spool within a spool cavity in the spool valve housing such that the circumferential surface of the land and the guiding surfaces are in sliding contact with an inner surface of the housing that defines the spool cavity, such that when the metering edge opens the control port the inner surface of the housing is supported by the contact with the guiding surfaces.

* * * * *